(12) United States Patent
Patoureaux et al.

(10) Patent No.: US 8,799,184 B2
(45) Date of Patent: Aug. 5, 2014

(54) METHOD AND SYSTEM FOR DETERMINING AN OPTIMAL LOW FARE FOR A TRIP

(71) Applicant: Amadeus S.A.S., Sophia Antipolis (FR)

(72) Inventors: Marc Patoureaux, Grasse (FR); Thierry Dufresne, Opio (FR); David Pauchet, Mougins (FR)

(73) Assignee: Amadeus S.A.S., Sophia Antipolis (FR)

( * ) Notice: Subject to any disclaimer, the term of this patent is extended or adjusted under 35 U.S.C. 154(b) by 0 days.

(21) Appl. No.: 13/647,095

(22) Filed: Oct. 8, 2012

(65) Prior Publication Data
US 2013/0030848 A1 Jan. 31, 2013

Related U.S. Application Data

(63) Continuation of application No. 12/562,116, filed on Sep. 17, 2009, now Pat. No. 8,311,859.

(30) Foreign Application Priority Data

May 18, 2009 (EP) .................................... 09305452

(51) Int. Cl.
*G06Q 99/00* (2006.01)
(52) U.S. Cl.
USPC .................................. 705/400; 705/6; 705/5
(58) Field of Classification Search
USPC ............................................. 705/400, 6, 5
See application file for complete search history.

(56) References Cited

U.S. PATENT DOCUMENTS

| | | | | |
|---|---|---|---|---|
| 7,742,934 B2* | 6/2010 | Offutt et al. | ....................... | 705/4 |
| 2003/0018499 A1* | 1/2003 | Miller et al. | ..................... | 705/5 |
| 2008/0010104 A1* | 1/2008 | Williamson et al. | .............. | 705/5 |

* cited by examiner

*Primary Examiner* — Akiba Allen
(74) *Attorney, Agent, or Firm* — Wood, Herron & Evans, LLP

(57) ABSTRACT

A method for determining an optimal fare for a trip comprising a departure location, an arrival location, the method comprises the following steps: sending a request for the trip wherein the request comprises a departure location, an arrival location and a corresponding fare for the trip; automatically modifying the request by searching in a predetermined database to determine a set of additional requests wherein each comprises at least one of the departure location, the arrival location or one or more additional locations which may form at least a part of the requested route wherein the predetermined database comprises said additional requests and a corresponding fare for each additional request; selecting one or more additional requests to form one or more alternative requests which include at least on of the departure location or the arrival location as the request; calculating the up to date fares for each alternative request in order to determine a resulting fare for each alternative request; comparing the fare and the resulting fares in order to determine the lowest resulting fare for the trip.

19 Claims, 4 Drawing Sheets

| Second request A⟶B | | |
|---|---|---|
| First request | Results | Fares |
| A B A | A ⟶ B ⟶ A | 80 € |
| A C | A ⟶ C (A⟶ B⟶C) | 85 € |
| A B | A ⟶ B | 100 € |

200

| Second request A⟶B | | |
|---|---|---|
| First request | Results | Fares |
| A B A | A ⟶ B ⟶ A | 80 € |
| A C | A ⟶ C (A⟶ B⟶ C) | 85 € |
| A B | A ⟶ B | 100 € |

| Second request B⟶ C | | |
|---|---|---|
| First request | Results | Fares |
| B C | B ⟶ C | 70 € |
| A C | A ⟶ C (A⟶ B⟶ C) | 85 € |

METHOD AND SYSTEM FOR DETERMINING AN OPTIMAL LOW FARE FOR A TRIP

CROSS-REFERENCE TO RELATED APPLICATIONS

This application is a continuation of application Ser. No. 12/562,116, filed Sep. 17, 2009, which claims the benefit of European Patent Application No. EP09305452.6 filed May 18, 2009. The disclosure of each of these patent documents is hereby incorporated by reference herein in its entirety.

FIELD OF THE INVENTION

The present invention relates to a method and system for determining an optimal fare for a specific trip, particularly but not exclusively in the travel industry domain.

BACKGROUND OF THE INVENTION

Nowadays, when a user wants to search for and book a trip comprising an airline flight, the user can request fares through a specific process. Thus, the user can search for fares in airlines databases which comprise such fares. The user may alternatively use on an airline website or an online travel agency. Before booking, the user can then compare the different fares displayed on each website for a specific flight from a departure point A to an arrival point C. Often, for the same airline, a fare for a direct flight from a point A to a point C is higher than a fare for a flight from a point A to a connection C and from the connection C to the point B. Therefore, when the user wants to fly from A to C only, the user books the cheapest flight which is the one from A to B comprising the connection C. Of course, the user only flies from A to C and does not use the flight from C to B. Thus, the airline books one seat on each flight for the user whereas the user only uses one seat for the flight from A to C. The airline notices the non-use of the seat for the flight from C to B only at the time of the flight. The airline cannot anticipate such a situation. Therefore, the airline cannot generally resell the non-used seat to another user before the flight from C to B departs. This type of situation happens regularly and airlines may wish to change these uncertain circumstances. Typically this situation is brought about by incorrect management of travel fares rules from airlines. Inconsistencies may arise when the airlines add new fares. The new fares are not always compared with previous fares relating to the same city pair or to other city pairs in combination with the requested trip.

Therefore, as previously mentioned, a combination of two indirect flights from A to C and from C to B is often cheaper than a direct flight from A to C. As a consequence, the user may wish to choose the A-C-B trip i.e. the cheapest one rather than the more expensive A-C flight. When a substantial number of users choose this cheapest solution, the number of no-shows on the C-B flight increases, which induces an important economic negative impact for the corresponding airline(s).

SUMMARY OF THE INVENTION

An object of the present invention is to alleviate at least some of the problems associated with the prior art systems.

According to one aspect of the present invention, there is provided a method for determining an optimal fare for a trip comprising a departure location, an arrival location, the method comprises the steps of sending a request for the trip wherein the request comprises a departure location, an arrival location and a corresponding fare for the trip; automatically modifying the request by searching in a predetermined database to determine a set of additional requests wherein each comprises at least one of the departure location, the arrival location or one or more additional locations which may form at least a part of the requested route wherein the predetermined database comprises said additional requests and a corresponding fare for each additional request; selecting one or more additional requests to form one or more alternative requests which include at least one of the departure location or the arrival location as the request; calculating the up to date fares for each alternative request in order to determine a resulting fare for each alternative request; comparing the fare and the resulting fares in order to determine the lowest resulting fare for the trip.

According to another aspect of the present invention, there is provided a non-transitory computer readable medium having stored thereon instructions executable by a processor of a computer for controlling the computer for carrying out a method for determining an optimal fare for a trip comprising a departure location, and an arrival location. The method comprises the steps of sending a user request having a requested route for the trip, wherein the user request comprises the departure location, the arrival location, and a corresponding fare for the trip; automatically modifying the user request by searching in a predetermined database to determine a set of additional requests, wherein each additional request comprises at least one of the departure location as requested in the user request, the arrival location as requested in the user request, or one or more additional locations to form at least a part of the requested route, wherein the predetermined database comprises said additional requests and a corresponding fare for each additional request; combining one or more of the additional requests to produce one or more alternative requests which result in a route having the requested departure location and the requested arrival location; calculating up to date fares for each alternative request in order to determine a resulting fare for each alternative request; and comparing the corresponding fare for the trip and the resulting fares in order to determine a lowest resulting fare for the trip including said requested route, when said computer program is executed on a programmable apparatus.

According to a second aspect of the present invention, there is provided a system for determining an optimal fare for a trip comprising a departure location, an arrival location; wherein the system comprises a request search module for receiving a request for a trip, wherein the request comprises a departure location, an arrival location and a corresponding fare for the trip; a predetermined database for determining a set of additional requests wherein each comprises at least one of the departure location, the arrival location or one or more additional locations which may form at least a part of the requested route wherein the predetermined database comprises said additional requests and a corresponding fare for each additional request; an encompassing engine for receiving the request and the one or more alternative requests and for calculating up to date fares for each additional request and for determining a resulting fare for each alternative request and for comparing the fare and the resulting fare for determining the lowest resulting fare for the trip.

BRIEF DESCRIPTION OF DRAWINGS

Reference will now be made, by way of example, to the accompanying drawings, in which:

FIG. 2 is a diagram of a table from a learning entity module in FIG. 1 by way of example, in accordance with one embodiment of the present invention;

FIG. 3 is a diagram of another table from a learning entity module in FIG. 1 by way of example, in accordance with one embodiment of the present invention;

DETAILED DESCRIPTION OF THE EMBODIMENTS

Figure 1:
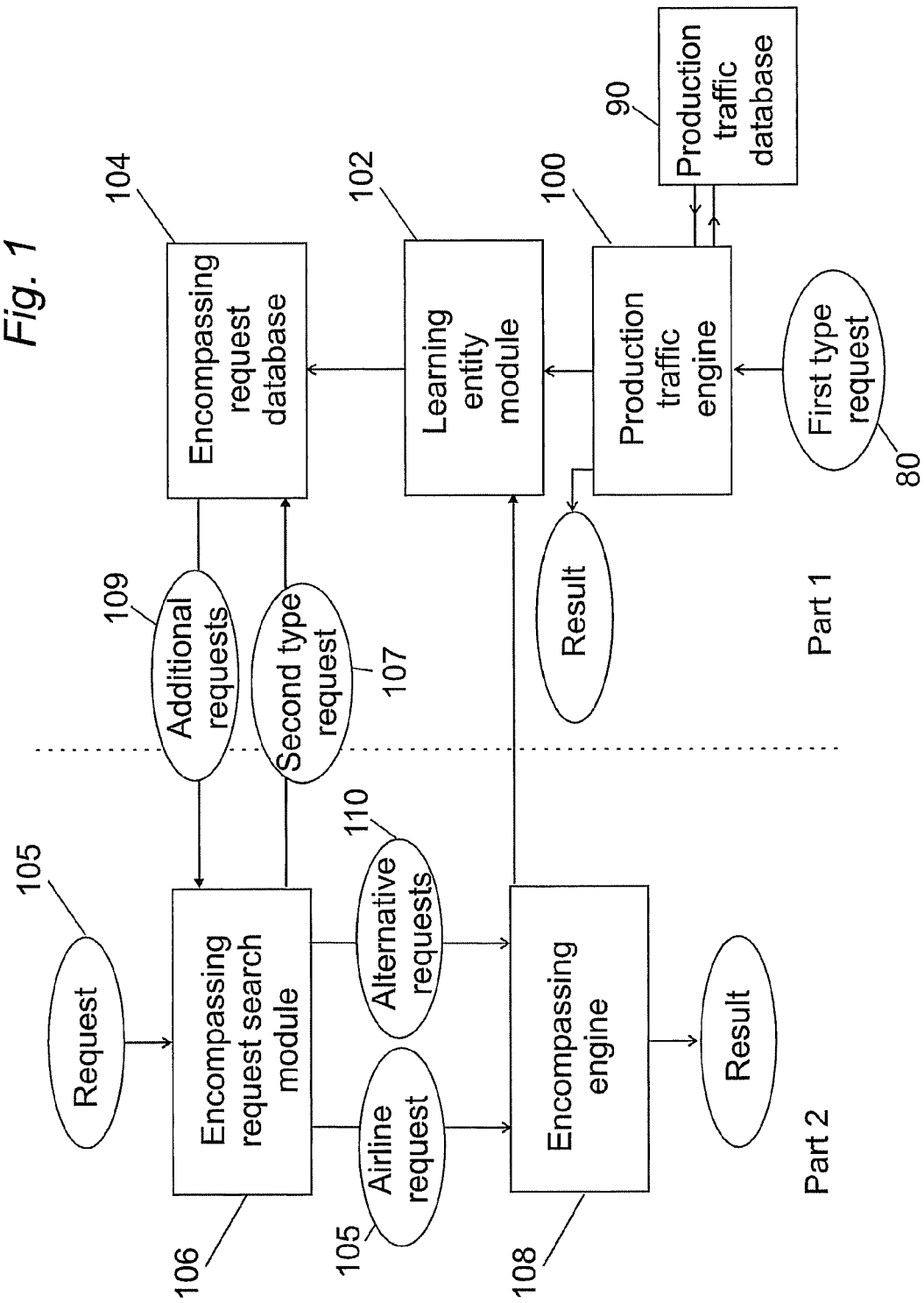
FIG. 1 is a diagram of the process for determining an optimal fare for a trip by way of example, in accordance with one embodiment of the present invention.

FIG. 1 shows a production traffic database 90 which relates to one or more airlines. This database 90 stores data relating to trips such as flights or routes, for example. The database 90 comprises a first database relating to fares and associated rules for each airline. A fare refers to the price of one or more flights including fees and taxes such as airport taxes and insurance fees. The database 90 also comprises a second database relating to the flights and their corresponding availabilities, for each airline. The first and the second databases provide data which include criteria such as a departure location and/or an arrival location and corresponding fare information where appropriate. The database 90 is connected to a production traffic engine 100. The production traffic engine 100 may support one or many travel suppliers or vendors. As shown in FIG. 1, users such as travelers, travel agents or airlines can send a first type request 80 to the production traffic engine 100 in order to find the lowest fare for a specific trip. Thus, the production traffic engine 100 regularly downloads data from the production traffic database 90 in order to find the lowest matching fares for a specific trip request. Thus, the production traffic engine 100 handles a significant amount of data relating to flights and fares.

Each first type request 80 comprises several criteria for a trip such as at least one departure location and arrival location. The result from the production traffic engine 100 comprises one flight or a combination of flights in order to identify the lowest available fare for the first type request.

When the result is one flight, this means that the lowest fare found by the production traffic engine 100 refers to a direct flight. When the result is a combination of flights, the combined flight resulting from the combination of the flights must have the same departure location and the same arrival location as these indicated in the request. In the situation where the result is a combination of flights, the combination of flights provides the lowest fare for the requested trip. Thus, the corresponding fare associated with the combined flight is lower than the fare associated with the direct flight.

In the example where the first type request 80 refers to a direct flight from a location A to a location B, the optimal result may relate to a combination of flights such as a flight from the location A to the location C and then another flight from the location C to the location B. In this case, this means that the combined flight comprising both flights from A to C and from C to B is cheaper than the direct flight from A to B.

As shown in FIG. 1, the production traffic engine 100 is connected to a learning entity module 102. The module 102 analyses and parses the results of the production traffic engine 100. The module 102 identifies each first type request from users and the corresponding result from the production traffic engine 100 in order to create specific tables for associating each first type request with a corresponding result.

As indicated in FIG. 2, each table 200 and 300 relates to a first type request, the possible corresponding result, which each comprises one flight or a combination of flights and a corresponding fare for the flight or the combined flight.

In addition, the first type request comprises elements which refer to a specific departure location, a specific arrival location and the corresponding fares at a specific date. Thus, for example in FIG. 2, the table relates to the departure location A and the arrival location B. The table 200 gathers possible first type requests and results as found in the production traffic engine 100. The table 200 does not only provide the lowest fare for the first type request for A to B but also indicates a number of possible first type requests for which the result includes a flight from A to B. The possible results in this example are: a round trip A to B; a combination of flights from A to B and from B to C to obtain a combined flight from A to C or a direct flight as requested from A to B. Each possible result is stored with its associated fare and its associated first type request.

The module 102 of FIG. 1 comprises a table for each departure location and arrival location encountered in the results of the production traffic engine 100. Thus, the module 102 also comprises another table 300 as indicated in FIG. 3 for example. The table 300 relates to another first type request of departure location B and arrival location C. The table 300 indicates two possible results: a direct flight from B to C; or a combination of flights from A to B and from B to C which includes the flight from B to C.

Returning to FIG. 1, the module 102 is connected to an encompassing request database 104. The module 102 stores the tables in the database 104. For example, the tables 200 and 300 are stored in database 104.

The encompassing request database 104 is connected to an encompassing request search module 106. The database 104 and the search module 106 can communicate with each other, i.e., the search module 106 can send a request to database 104 which can send additional requests 109 back to the search module 106. An airline company (not shown) can send an airline request 105 to the encompassing request search module 106. The airline request 105 is the input request which is required for the process to take place in accordance with the present invention. The airline request 105 comprises a trip including a departure location, an arrival location and a corresponding fare such as for example a departure location A, an arrival location C and a fare of C=200. The function of the search module 106 is to determine the lowest alternative requests associated with the trip as indicated in the airline request 105 from the airline company. Thus, the search module 106 has to launch a second type request 107 to the encompassing request database 104. The second type request 107 only comprises the indication of the departure location and the arrival location from the airline request 105. The database 104 broadens the second type request 107 to search among the stored first type request and their corresponding results and fares for all the possibilities matching the second type request 107. Then, the database 104 returns the additional requests with expected fares and results to the search module 106.

In case the trip from the airline request 105 is made of several departure and arrival locations, then the encompassing request search module 106 builds a list of alternative requests by assembling together additional requests from each couple of departure location and arrival location from the airline request.

The encompassing request search module 106 is connected to an encompassing engine 108. The engine 108 calculates in real time the optimal fares associated with each alternative request received from the encompassing request search module 106. The engine 108 also compares the fare indicated in the airline request 105 from the airline and the resulting fares as calculated for the alternative requests found from the encompassing request search module 106.

Thus the engine 108 determines the optimal fare between the fares indicated in the airline request 105 and the fares found from the alternative requests.

Figure 4:
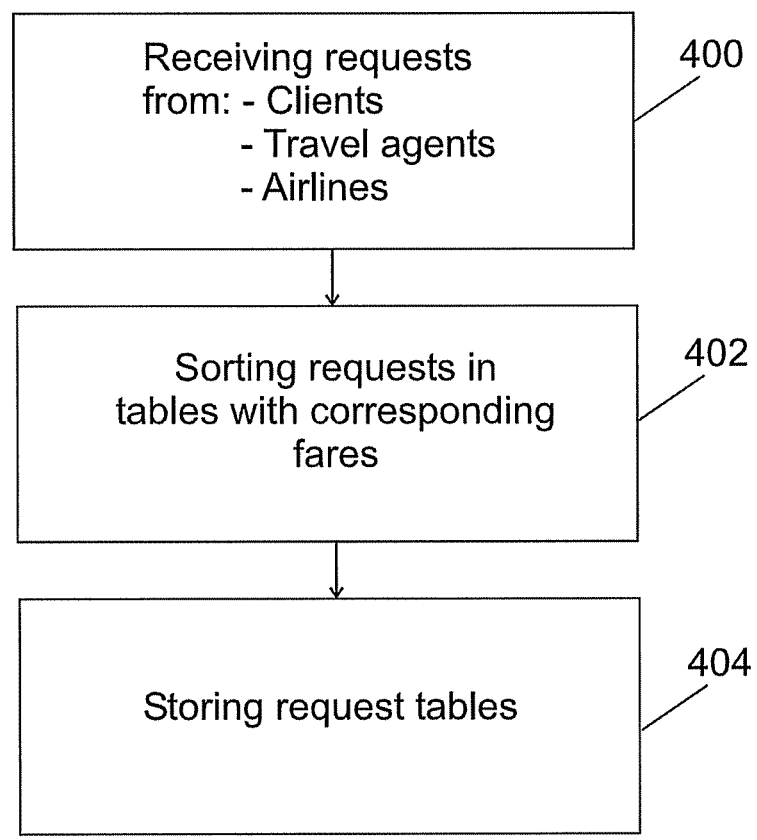
FIG. 4 is a flow chart of the method steps of a part 1 of the process of the FIG. 1 by way of example, in accordance with one embodiment of the present invention.

The method of the system as described above will be now explained by the following steps. As shown in FIG. 4, in the step 400, the production traffic engine 100 receives first type requests from clients, travel agents or airlines. Then, in a step 402, the learning entity module 102 sorts and analyses the first type requests and the corresponding first type results stored in the production traffic engine 100. The learning entity module 102 creates tables in order to associate each first type request with a corresponding first type result and fare. Then, in a step 404, the database stores the first type results and the corresponding fare as selected from the learning entity module 102 for each first type request.

Figure 5:
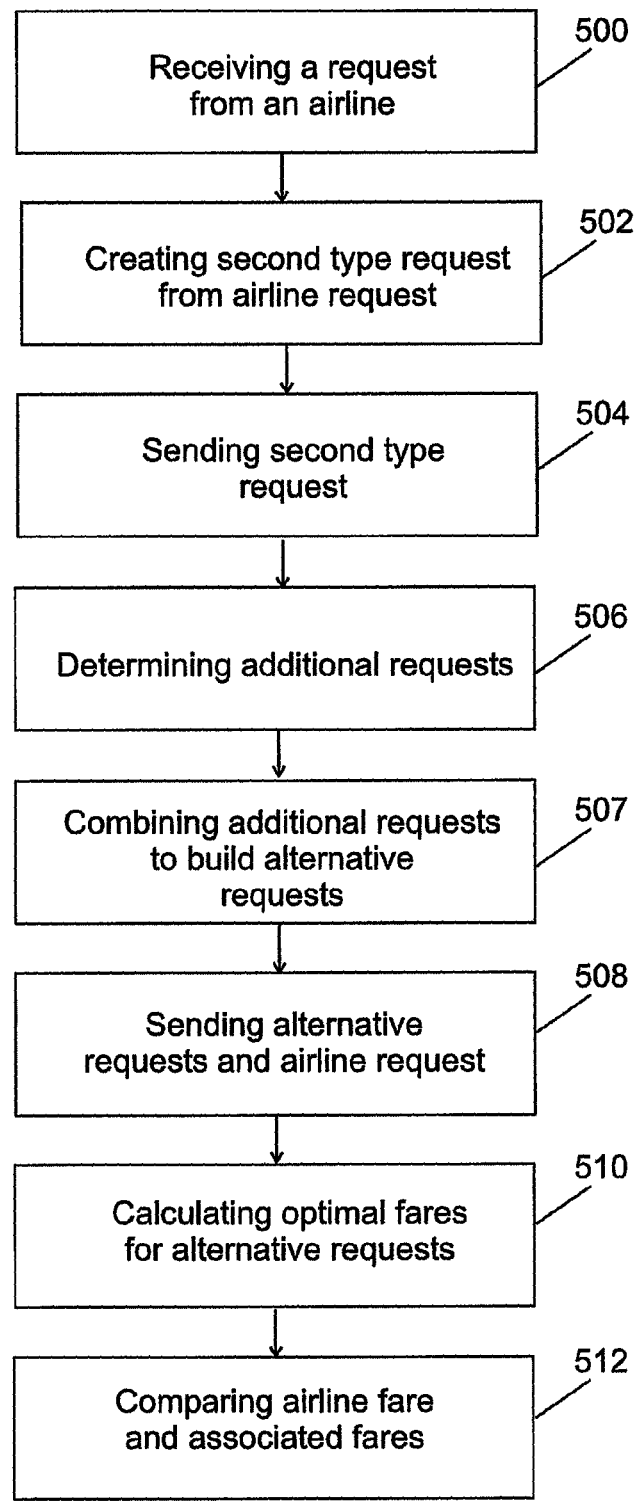
FIG. 5 is a flow chart of the method steps of another part 2 of the process of the FIG. 1 by way of example, in accordance with one embodiment of the present invention.

The process steps then continue as shown in FIG. 5. In step 500 the airline sends an airline request 105 to the encompassing request search module 106. The airline request 105 relates to a trip and comprises a departure location and an arrival location with a corresponding fare. For example, an airline request 105 may occur when the airline has determined that the flights for a specific trip were consistently under booked over recent months. In this situation, the airline may wish to determine if such a decrease in the bookings is caused by the fare being more costly than other fares found from an encompassing request. As a result, the airline may launch a request to determine if a lower fare exists among the fares already proposed by the same or other airlines.

In step 502, the encompassing request search module 106 then modifies the content of the airline request 105 in order to provide a second type request 107. The modification comprises the removal of the or each fare from the request 105. Thus, the second type request 107 does not comprise the fare or fares as indicated in the first type request 105. In case of multiple origins and destinations in the airline request, the step 502 will build several second type request associated to each pair of origin and destination. In step 504, the encompassing request database launches the second type request 107 to the encompassing request database 104. In step 506, the encompassing request database 104 uses the stored first type results in order to encompass the second type request 107. The use of the first type results provides one or more additional requests which may form at least a part of the second type request 107. Thus, the encompassing request database 104 builds one or more additional requests whose result comprises the departure location and arrival location of the second type request 107. The encompassing request database 104 retrieves only a predetermined number (n) of the optimal first type requests and associated result. The predetermined number (n) can be specified in the encompassing request database 104.

The encompassing request database 104 then sends additional requests to the encompassing request search module 106. In Step 507, the encompassing request search module builds alternative requests 110 by combining the additional requests 109 received from encompassing request database 104. The encompassing request search module 106 sends both request 105 and alternative requests to the encompassing engine 108 in step 508. In step 510, the encompassing engine 108 calculates in real time the fares associated with the alternative requests. Subsequently in step 512, the encompassing engine 108 compares fares and determines the optimal fare and the corresponding trip. The corresponding trip can be more expensive than the fare specified in request 105 which means that the airline presently provides the lowest price for this trip. Alternatively, the corresponding trip can be cheaper than the fare specified in the request 105 which means that the airline provides a less favourable fare for the requested trip. In order to solve the inconsistency, the airline can for example lower the fare of the requested trip or increase the fare of the alternative trip. Thus, users will preferably book the trip of the airline request.

The modification of the request 105 can be calculated in an exhaustive manner. For example, in a situation where the airline request deals with a direct flight, the calculation for the broadening of the airline request to obtain the possible corresponding round trips or combined trips will deal with many possible results. This calculation does not take into account the comparison of fares for each possible and may result in at least 1 million separate requests. This number of requests represents a significant amount of computing time. The present invention provides a broadening of the request by using a predetermined database which stores the possible additional requests with their corresponding lowest fares. Thus, in the present invention, the broadening of the airline requests only deals with possible first type results which are already relevant in terms of the fare level, destination etc. Therefore, the present invention provides a search in an improved manner by significantly reducing the computing time.

It will be appreciated that various combinations of method steps in combination of alone may be carried out for different elements of the overall process. The various combinations are not limited to those described above. It will be appreciated that this invention may be varied, in many different ways and still remained with the entirely scope and spirit of the invention. Furthermore, the person skilled in the art will understand that some or all of the functional entities as well as the processes themselves may be embodied in software or one or more software enable to modules and/or devices.

What is claimed is:

1. A method for determining a lowest resulting air fare for a trip, the method comprising:

receiving a user request specifying a first route for the trip at a processor of a computer, wherein the user request comprises a departure location of the first route, an arrival location of the first route, and an air fare set by an airline company for the trip;

recalling a table stored in a database based on the departure location and the arrival location of the user request, the database comprising a plurality of stored tables, each table having a departure location and an arrival location associated therewith, wherein each table of the database includes a plurality of entries, and wherein each entry comprises one or more flights including the departure location associated with table, the arrival location associated with the table, and optionally one or more additional locations, and an expected air fare for the one or more flights;

building, with the processor, one or more alternative requests using the entries in the table, wherein each alternative request results in a second route having the departure location and the arrival location of the user request;

calculating an air fare for each alternative request; and comparing, with the processor, the air fare of the user request and the air fare for each alternative request in order to determine a lowest air fare for the trip.

2. The method of claim 1, wherein receiving the user request comprises:
receiving the user request at a request search module.

3. The method of claim 1, further comprising:
removing the corresponding air fare from the user request to obtain a modified request used to search in the database.

4. The method of claim 3, further comprising:
sending the modified request to the database.

5. The method of claim 2, further comprising:
receiving the one or more alternative requests at the request search module.

6. The method of claim 1, further comprising:
sending the user request and the one or more alternative requests to an encompassing engine.

7. A system for determining a lowest resulting air fare for a trip, the system comprising:
at least one processor; and
a request search module executable as instructions on the processor, the request search module configured to receive a user request specifying a first route for the trip, wherein the user request comprises a departure location of the first route, an arrival location of the first route, and an air fare set by an airline company for the trip;
a database coupled with the processor, the database comprising a plurality of stored tables, each table having a departure location and an arrival location associated therewith, wherein each table of the database includes a plurality of entries, and wherein each entry comprises one or more flights including the departure location associated with the table, the arrival location associated with the table, and optionally one or more additional locations, and an expected air fare for the one or more flights, wherein the request search module is configured to recall a table in the database based upon the departure location and the arrival location of the user request, and wherein the search request module is configured to build one or more alternative requests using the entries in the table, wherein each alternative request results in a second route having the departure location and the arrival location of the user request; and
an encompassing engine executable as instructions on the processor, the encompassing engine configured to receive the user request and the one or more alternative requests, configured to calculate an air fare for each alternative request, and configured to compare the air fare of the user request and the air fare for each alternative request in order to determine a lowest air fare for the trip.

8. A computer program product for determining a lowest resulting air fare for a trip comprising:
a non-transitory computer readable medium; and
computer executable instructions stored on the computer readable medium and configured, upon execution by at least one processor, to cause the cause the processor to:
receive a user request specifying a first route for the trip, wherein the user request comprises a departure location of the first route, an arrival location of the first route, and an air fare set by an airline company for the trip;
recall a table stored in a database based upon the departure location and the arrival location of the user request, the database comprising a plurality of stored tables, table having a departure location and an arrival location associated therewith, wherein each table of the database includes a plurality of entries, and wherein each entry comprises one or more flights including the departure location associated with the table, the arrival location associated with the table, and optionally one or more additional locations, and an expected air fare for the one or more flights;
build one or more alternative requests using the entries in the table, wherein each alternative request results in a second route having the departure location and the arrival location of the user request;
calculate an air fare for each alternative request; and
compare the air fare of the user request and the air fare for each alternative request in order to determine a lowest fare for the trip.

9. The computer program product of claim 8, wherein the instructions configured to cause the processor to receive the user request comprise instructions configured to cause the processor to:
receive the user request at a request search module.

10. The computer program product of claim 9, wherein the instructions are further configured to cause the processor to:
receive the entries from the table at the request search module to build the one or more alternative requests.

11. The computer program product of claim 8, wherein the instructions are further configured to cause the processor to:
remove the corresponding air fare from the user request to obtain a modified request; and
send the modified request to the database for searching in the database.

12. The computer program product of claim 8, wherein the instructions are further configured to cause the processor to:
send the user request and the one or more alternative requests to an encompassing engine configured to calculate the air fare of each alternative request in real time.

13. The method of claim 1, wherein the user request is received from an airline company.

14. The system of claim 7, wherein the user request is received from an airline company.

15. The method of claim 1, wherein each entry includes a previous first-type request associated therewith.

16. The method of claim 15, wherein the one or more flights of each entry represent the lowest-cost option satisfying the previous first-type request associated therewith.

17. The method of claim 1, further comprising:
receiving a first-type request comprising a specific departure location, a specific arrival location and a corresponding fare at a specific date;
generating at least one first-type result based on the first-type request, the first-type result comprising an associated fare and one or more flights having a combined flight beginning at the specific departure location and ending at the specific arrival location; and
adding the first-type request and the at least one first-type result to any table stored in the database having a departure location and an arrival location associated therewith that are also in the first-type result.

18. The method of claim 17, wherein the at least one first-type result is the lowest cost option satisfying the first-type request.

19. The method of claim 1, wherein the one or more flights of each entry comprise the one or more additional locations.

* * * * *

UNITED STATES PATENT AND TRADEMARK OFFICE
CERTIFICATE OF CORRECTION

| | | |
|---|---|---|
| PATENT NO. | : 8,799,184 B2 | Page 1 of 1 |
| APPLICATION NO. | : 13/647095 | |
| DATED | : August 5, 2014 | |
| INVENTOR(S) | : Marc Patoureaux et al. | |

It is certified that error appears in the above-identified patent and that said Letters Patent is hereby corrected as shown below:

In the Claims

At column 7, line number 58, after "to cause" delete --the cause--

At column 8, line number 2, before "table", insert --each--

Signed and Sealed this
Eleventh Day of November, 2014

Michelle K. Lee
*Deputy Director of the United States Patent and Trademark Office*